United States Patent [19]

Knapp

[11] Patent Number: 4,709,722

[45] Date of Patent: Dec. 1, 1987

[54] VALVE APPARATUS FOR CRANKCASE OIL DRAINAGE

[76] Inventor: Paul A. Knapp, 1303 W. 9th St., Tempe, Ariz. 85282

[21] Appl. No.: 909,876

[22] Filed: Sep. 22, 1986

[51] Int. Cl.$^4$ ............................................. F16K 15/04
[52] U.S. Cl. ................................. 137/539; 137/515.5; 184/1.5
[58] Field of Search ............... 137/515, 515.5, 533.11, 137/539; 184/1.5; 417/478

[56] References Cited

U.S. PATENT DOCUMENTS

| | | | |
|---|---|---|---|
| 1,818,123 | 8/1931 | Engbrecht | 184/1.5 |
| 2,206,992 | 7/1940 | Wood | 184/1.5 |
| 2,903,014 | 9/1959 | Sheppard | 137/539 |
| 2,932,043 | 4/1960 | Bischoff | 417/478 |
| 3,103,947 | 9/1963 | Mueller | 184/1.5 X |
| 3,290,000 | 12/1966 | Snyder | 137/533.11 X |
| 4,492,249 | 1/1985 | Arino | 137/515 |

FOREIGN PATENT DOCUMENTS 1453487 4/1969 Fed. Rep. of Germany ...... 417/478

Primary Examiner—Robert G. Nilson
Attorney, Agent, or Firm—H. Gordon Shields

[57] ABSTRACT

Valve apparatus for draining oil from a vehicle crankcase includes a valve body having a pair of intersecting bores. One of the bores communicates with the vehicle crankcase and receives oil therefrom. A tubular insert extends into the intersecting bore, with part of the insert extending outwardly from the valve body. The end of the insert which is disposed within the valve body comprises a valve seat, and a spring-loaded ball check is disposed within the tubular insert. The spring biases the ball against the seat until low pressure is applied to the insert to withdraw the ball from the seat. When the ball is withdrawn from the seat, oil is drained from the crankcase. A hose or tube is secured to the end of the insert outside of the valve body and is appropriately connected to a source of low pressure for draining the oil.

6 Claims, 6 Drawing Figures

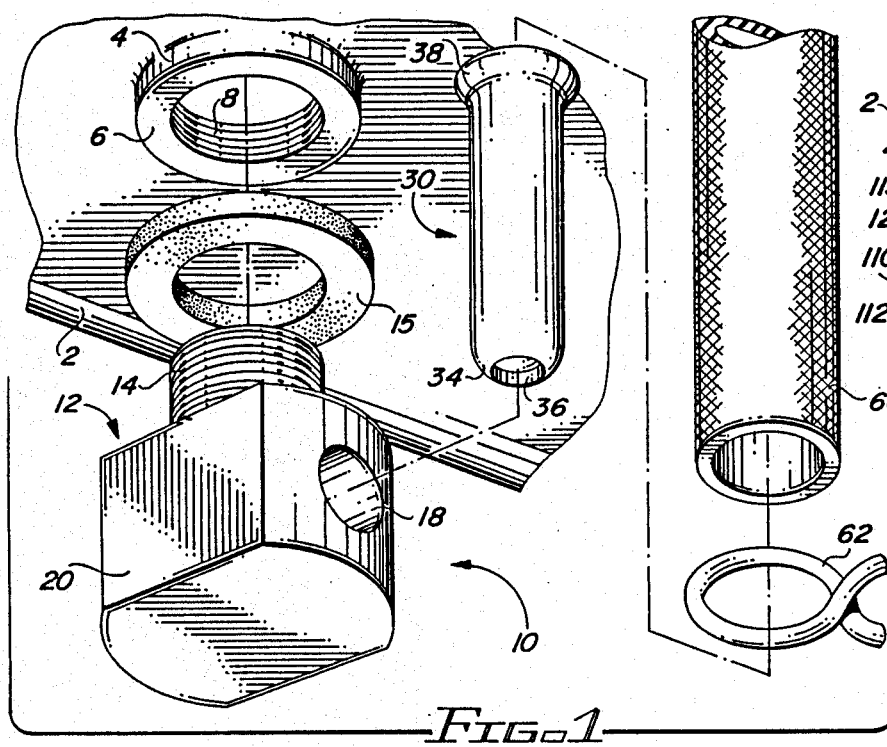
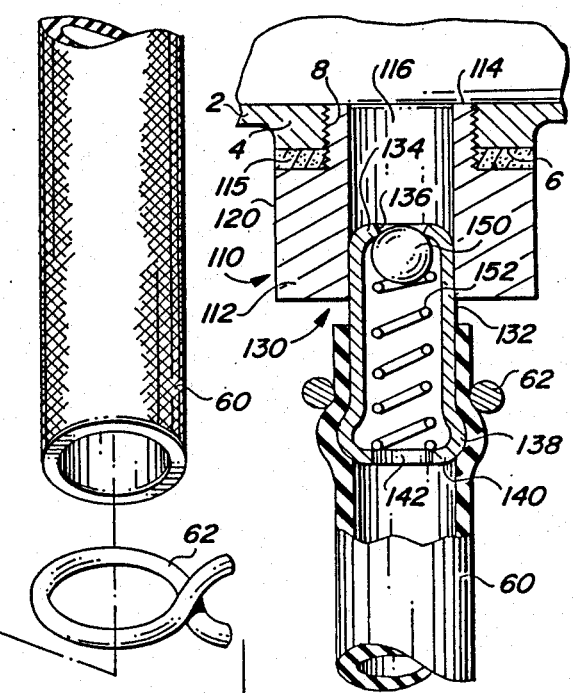
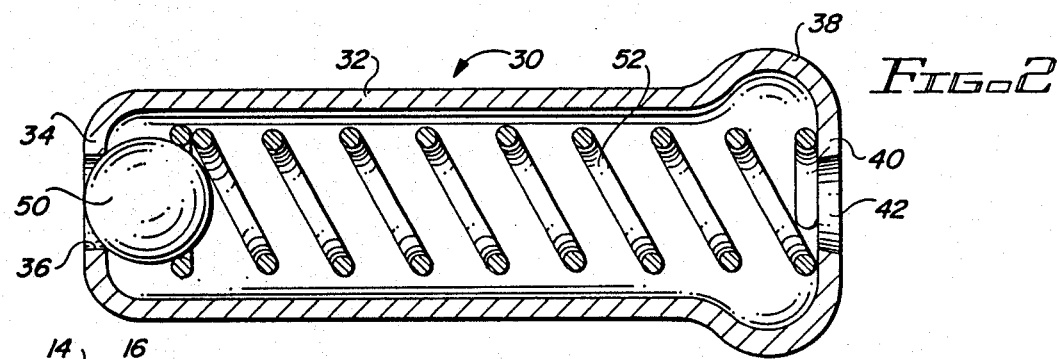
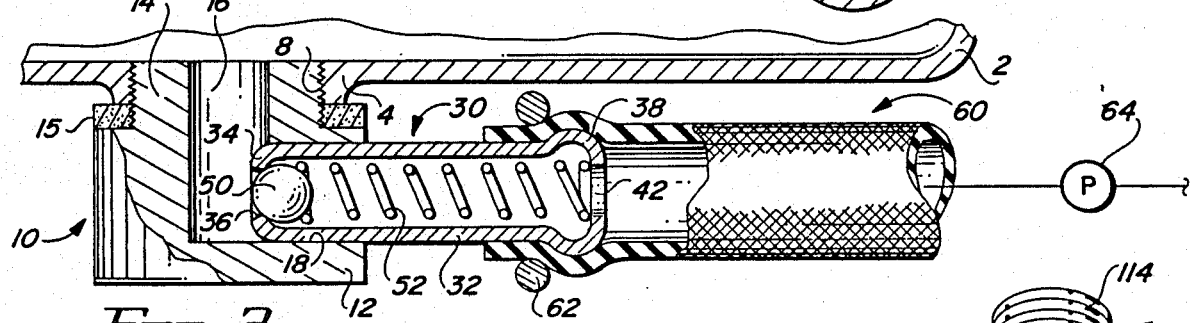
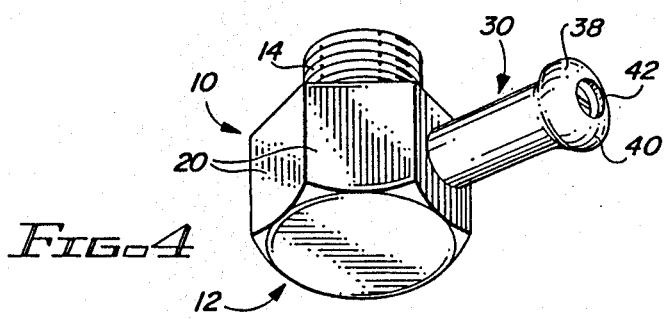
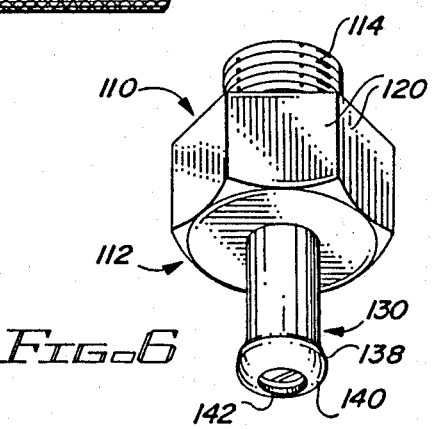

VALVE APPARATUS FOR CRANKCASE OIL DRAINAGE

BACKGROUND OF THE INVENTION

1. Field of the Invention

This invention relates to valves having a ball check, and, more particularly, to valves having a ball check for controlling the flow of oil from a crankcase utilizing low pressure, as from a pump, to withdraw the ball check from its valve seat to allow the oil to drain.

2. Description of the Prior Art

U.S. Pat. No. 2,206,992 (Wood) discloses a powered unit for removing oil from the crankcase of a vehicle. The unit includes a springbiased ball check disposed against a seat. The seat is at the juncture of the valve body and the vehicle drain opening. The valve body threadedly extends into the drain opening. When low pressure is applied to a conduit connected to the valve body, the ball is biased away from the seat and the oil flows from the crankcase.

U.S. Pat. No. 1,885,042 (Baldwin, Jr.) discloses a hydraulic coupling in which a hydraulic line is coupled to a body mounted rigidly to a plate. The tubular element includes a flange, and a coupling nut threadedly forces the flange against a mating flange in the body to secure the coupling.

U.S. Pat. No. 2,216,360 (Sweetland) discloses another type of valve arrangement for draining oil from a crankcase. The apparatus includes a valve body having an internal bore with a valve seat defined at one end of the bore. The valve seat is a conically tapered seat adapted to receive a spring biased ball. A positive displacement pump is disposed within the crankcase, and the valve is moved away from its seat under the pressurized flow of the oil from the crankcase.

U.S. Pat. No. 3,196,982 (Dinkelkamp) discloses another type of crankcase drainage system in which a receiving vessel is supported directly from the engine by means of a hook assembly which is inserted through the drain opening into the interior of the oil plan. A hose extends from the receiving vessel to a pump for pumping the oil from the receiving vessel. The oil ultimately flows to a collection drum. A handle on the side of the collection vessel is secured to a shaft, and the shaft in turn extends to the hook assembly so that the hook assembly may be spread apart to hold the receiving vessel beneath the drain opening when the hook assembly is inserted through the drain opening. The operator makes no contact with the oil, directly, since the hook assembly is spread by simple rotation of the handle and the shaft. It will be noted that no valve system is involved, but a pump assembly is involved.

U.S. Pat. No. 3,282,380 (Burrell et al) discloses a system for changing oil in automotive vehicles by utilizing a reversible pump. The apparatus is permanently mounted through the drain opening of an engine and the reversible pump is actuated to pump oil from the crankcase to a waste receptacle, and then the pump is reversed and connected to an oil supply so that clean oil is pumped back into the crankcase to complete the oil change.

U.S. Pat. No. 3,743,053 (Kuklewicz) discloses another system for removing oil from a crankcase. The apparatus includes a valve body secured to the oil drain hole and tubing which extends from the valve body to a pump mounted on the engine. The pump body includes three separate bores, including a relatively small diameter bore at the juncture of the valve body and the crankcase, and a larger diameter bore extending downwardly from the small diameter bore. A spring biased ball check is disposed in the large diameter bore so that the ball is biased against the valve seat to prevent oil from draining from the crankcase. A third bore extends from the large diameter bore and flared tubing is secured to the third bore. In turn, the tubing extends to a pump. The end of the third bore, remote from the large diameter bore, includes a tapered outer portion which engages the flared end of the tubing. A coupler element secures the flared end of the tubing to the valve body at the outer end of the third bore. As with most of the above-discussed drain systems, the pump provides low pressure for retracting the ball from its seat so that the oil flows out of the crankcase.

The above-discussed patents reflect various elements which are relatively costly to machine and to assemble in the numerous bores, threaded elements, etc. In contrast, the apparatus of the present invention includes only one threaded portion, the portion of the valve body which threadly engages the il drain opening. Two intersecting bores extend through the valve body, and a tubular element extends into the one bore and is simply press fitted within one of the bores. Within the tubular element is a spring biased ball check. The cost to manufacture and assemble such apparatus is substantially less than the cost to manufacture and assemble the valves and other apparatus discussed above. In addition, the tubular element is easily connected to a flexible hose, thus eliminating the need for tubing and for the necessary machined and threaded elements required to secure metal tubing to the valve body.

SUMMARY OF THE INVENTION

The invention described and claimed herein comprises a valve valve body having a pair of bores. One bore extends into the valve body and terminates in an externally threaded boss which extends into the drain opening of a crankcase. A tubular element having a spring biased ball check extends into the other bore. The spring biased ball check element is disposed against an integral valve seat within the tubular element. The opposite end of the tubular element from the valve seat is disposed outwardly from the valve body and is adapted to be secured to flexible tubing, such as neoprene rubber, various plastics, etc., which in turn extend to a pump. Low pressure from the pump causes the ball to retract from its seat and allows oil to flow from the crankcase.

Among the objects of the present invention are the following:

To provide new and useful valve apparatus;

To provide new and useful apparatus for draining oil from a crankcase;

To provide new and useful valve apparatus including a spring biased ball check;

To provide new and useful valve apparatus for controlling the flow of a fluid; and To provide new and useful valve apparatus for controlling the flow of a fluid in which the valve apparatus includes a pair of bores and a valve element is disposed within an insert in one of the bores.

BRIEF DESCRIPTION OF THE DRAWING

FIG. 1 is an exploded perspective view of the apparatus of the present invention.

FIG. 2 is a side view in partial section of a portion of the apparatus of the present invention.

FIG. 3 is a side view in partial section of the apparatus of the present invention in its use environment.

FIG. 4 is a bottom perspective view of the apparatus of the present invention.

FIG. 5 is a side view in partial section of an alternate embodiment of the apparatus of the present invention in its use environment.

FIG. 6 is a perspective view of the apparatus of FIG. 5.

DESCRIPTION OF THE PREFERRED EMBODIMENT

FIG. 1 is an exploded perspective view of drain valve apparatus 10, and some of the elements associated therewith, spaced apart from an oil pan 2 of a vehicle to which the drain valve apparatus 10 is to be secured. The oil pan 2 includes a boss 4 extending outwardly from the pan. The boss 4 includes a flat 6 and an internally threaded bore 8. The oil pan, with its boss and flat, comprise the use environment for the drain valve apparatus 10.

The drain valve apparatus 10 includes a valve block 12, with a plug portion 14 extending upwardly from its valve block 12. The plug portion is externally threaded to mate with the internally threaded bore 8 of the boss 4 of the oil pan 2. A bore 18 is shown extending inwardly with respect to the block 12, and substantially perpendicular to the longitudinal axis of the externally threaded portion 14. The valve block 12 also includes a pair of wrench flats 20, one of which is shown in FIG. 1. The wrench flats 20 comprise a pair of generally parallel faces which receive the jaws of a wrench to aid in securing the valve 10 to the boss 6 of the boss 4 of the oil pan 2.

A gasket 15 is shown in FIG. 1 disposed between the flat 6 of the boss 4 and the valve apparatus 10. The gasket 15, of course, is disposed about the plug 14 and against the valve block 12 to insure a sealing engagement between the flat 6 of the boss 4 and the valve block 12 of the drain valve apparatus 10.

Shown spaced apart from the valve block 12 in FIG. 1 is a tubular insert or sleeve 30. The insert or sleeve 30 is shown in partial section in FIG. 2. The outer diameter of the insert 30 is substantially the same as the inner diameter of the bore 18 of the valve block 12. The insert 30 accordingly extends into the bore 18 and is secured therein, by a press fit.

Spaced apart from the tubular insert 30 is a drain hose or tubing 60 which is appropriately secured, as by a clamp 62, to the tubular insert 30, or, as shown best in FIG. 3, to the distal end of the insert 30, remote from the valve body 12.

As indicated above, FIG. 2 is a view in partial section through the insert 30. FIG. 3 is a view in partial section of the valve apparatus 10 and the pan 2, illustrating the operation of the valve apparatus 3. FIG. 4 is a bottom perspective view of the assembled drain valve apparatus 10. For the following discussion, reference will primarily be made to FIGS. 1, 2, 3, and 4.

The pump 64 is schematically represented in FIGS. 1 and 3 as being secured to the distal end of the drain hose or tubing 60, remote from the oil pan 2 and from the drain valve apparatus 10. The pump 4 provides suction or low pressure to the hose 60 and which in turn is presented to the valve apparatus 10, as will be explained below, to drain oil from the crankcase 2.

Extending through the exteriorly threaded plug portion 14 and into the valve block 12 is a bore 16. The bore 16 communicates directly through the plug portion 14 to the interior of the oil pan 2. Oil from the oil pan 2 flows into the bore 16.

The bore 18 extends into the valve block 12 and intersects the bore 16. The tubular insert 30 extends into the bore 18. Accordingly, oil flows from the oil pan through the bore 16 and into the insert 30 when the pump 64 is actuated to provide low (suction) pressure to the valve 10 through the hose 60.

The tubular insert 30 includes three primary portions, a relatively elongated tubular portion 32, a swaged or curved inner end 34, and an outer coupling portion 38. Extending through the swaged inner end 34 is an aperture 36. The diameter of the ball 50 is greater than the diameter of the aperture 36. The outer periphery of the aperture 36 within the swaged portion 34 comprises a valve seat for the ball check element 50.

The coupling portion of the insert 38, remote from the inner end 34 and the aperture 36 comprises a portion of increased diameter with respect to the tubular portion 32. The outer or distal end of the coupling portion 38 also includes a substantially reduced diameter portion 40, and an aperture 42 extends through the end 40. The aperture 42 is about the same size as the diameter of the aperture 36.

The purpose of the coupling portion 38, the diameter of which is slightly greater than that of the tubular portion 32, is to allow the hose or tubing 60 to be appropriately secured to the tubular insert 30.

Within the insert 30, and extending between the end 40 and the ball check element 50, is a compression spring 52. The compression spring 52 provides a bias to hold the ball 50 against its valve seat about the aperture 36. The diameter of the coils of the spring 52 is greater than the diameter of the aperture 42, and the spring 52 accordingly maintains its position within the insert 30.

As best shown in FIGS. 3 and 4, a portion of the insert 30 is disposed within the bore 18, and a portion of the insert 30 is disposed outwardly from the valve block or body 12. The hose or tubing 60 is shown in FIG. 3 disposed about the coupling portion 38. The hose 60 is held against the coupling portion 38 by an appropriate clamp element 62. The clamp 62 may be a Corbin-type clamp, or any other appropriate clamp element, as desired.

Where it is desired to drain the oil from the crankcase 2, the pump 64 is turned on. A suction or low pressure, that is, a pressure less than atmospheric pressure, is placed on the hose or tubing 60. The low pressure in turn causes the ball 50 to be retracted against the force or bias of its spring 52. Oil accordingly flows from the crankcase 2 through the bore 16 and into the interior of the tubular insert 30. The oil flows through the aperture 36 into the interior of the tubular insert 30 and out through the aperture 42 of the insert 30 and into the hose or tubing 60. The oil then flows through the pump 64 and is appropriately drained into a container, receptacle, etc., as desired.

When the pump 64 is turned off, the suction or low pressure against the ball 50 is released, and the force or bias of the compression spring 52 causes the ball 50 to seat against its valve seat about the aperture 36 to prevent futher flow of oil through the bore 16 and into the tubular insert 30. The crankcase 2 may be refilled with new oil, etc.

FIG. 5 shows a slightly different embodiment of the valve apparatus 10 in which a valve apparatus 110, an alternate embodiment drain valve apparatus, includes a pair of straight bores instead of intersecting bores as in drain valve apparatus 10.

The alternate embodiment drain valve apparatus 110 includes a valve block 112 with an externally threaded plug 114 extending upwardly from the block and secured to the internal threads 8 of the boss 4 of the oil pan 2. A gasket 115 is disposed about the plug portion 114 and between the valve body 112, and the flat portion 6 of the boss 4.

Within the block 112 and the plug 114 is a bore 116. The bore 116 communicates within the interior of the oil pan 2. The valve block 112 also includes a pair of wrench flats 120.

The drain valve apparatus 110 includes a tubular insert 130 which is substantially identical to the tubular insert 30. The insert 130 includes a tubular portion 132 with a swaged inner end 134. An aperture 136 extends through the inner end 134. A valve seat is defined within the inner end about the aperture 136.

Remote from the inner end 134 there is a coupling portion 138. The coupling portion 138 includes an area or portion of enlarged diameter adjacent to an end wall 140, with an aperture 142 extending through the end wall. The hose 60 is appropriately secured to the coupling portion 138 by the clamp 62.

As with the valve apparatus 10, a substantial amount of the tubular portion 132 of the insert 130 is disposed outside of the valve block 112. The inner end 134 is, of course, disposed within the bore 116. The coupling portion 138, and an appropriate length of the tubular portion 132 of the insert 130, is disposed outside the valve block 112. The overall length of the insert 130, like the overall length of the insert 30, depends generally on the amount of the insert required to be inserted into the bore of the valve block 112 to secure the inset to the valve block, and the appropriate length required to secure the hose or tubing 60 to the insert 130.

In FIG. 5, the tubular insert 130 is shown relatively short, at least as compared to the showing of the insert 30 and the valve body 12 in FIG. 3. It will be noted in FIG. 3 that a relatively short amount of the hose or tubing 60 is secured to the tubular insert 30. In FIG. 5, the tubular insert 130 is relatively shorter, and thus a relatively short length of the tubular portion 130 is shown between the end of the hose or tubing 60 and the valve body 112.

Within the tubular insert 130 is a ball check element 150. The ball check element 150 is biased against its valve seat about the aperture 136 at the inner end 134 of the insert 130 by a compression spring 152.

The valve apparatus 110 works in substantially the same manner as the valve apparatus 10. That is, an appropriate pump, such as the pump 64, is secured to the hose 60. When the pump 64 is actuated, a low pressure or suction force is applied to the hose 60 to cause the ball 152 to be retracted from its seat about the aperture 136 and against the force or bias of the compression spring 152. Oil then flows from the crankcase 2 through the bore 116, through the aperture 136 into the interior of the coupling element 130, and outwardly from the coupling element through the aperture 142 and into the hose or tubing 60.

As is well known and understood, the hose or tubing 60 will not deform under the low pressure imposed by the pump 64. The hose or tubine 60 accordingly maintains itself as a viable conduit for the oil draining from the crankcase.

FIG. 6, which is a bottom perspective view of the valve apparatus 110, illustrates the overall effect of the in-line valve 110. FIG. 4, which is a bottom perspective view of the valve apparatus 10, may be conveniently compared to the valve apparatus 110 in a side-by-side comparison of the Figures. The in-line valve apparatus 110 may have advantages under certain circumstances over the valve apparatus 10. On the other hand, for most automotive applications, it would appear that the valve apparatus 10, which includes the pair of intersecting bores, within bores at substantially right angles to each other, may be advantageous for automotive and related applications. For some reciprocating aircraft engines, the in-line drain valve 110 may be advantageous. In such case a drain hose 60 may be conveniently secured to the valve. For some industrial engines, the in-line valve 110 may also be advantageous over the drain valve apparatus 10.

Essentially, the in-line valve apparatus 110 includes a relatively straight bore 116. However, the bore 116 may be considered as including two portions, a free portion which communicates directly with the interior of the crankcase 2, and a bore portion which receives the insert 132. If desired, or if advantageous, the diameter of the two bore portions may be different so as to define two separate bores, one of which receives so as to define two separate bores, one of which receives a tubular insert and one of which communicates directly with the crankcase.

The tubular insert to the valve body, such as the insert 30 or the insert 130, includes an integral valve seat at one end of the tubular element and a connector portion at the other end of the tubular element. A compression spring is disposed within the tubular element between a ball check element at the valve seat and the other end of the tubular element to provide a bias to hold the ball against its valve seat, or against the integral valve seat, of the tubular element. The advantages of such a tubular element in a valve housing are obvious in terms of low cost, ease of assembly, ease of manufacture, and ease of operation.

While reference is made to a crankcase and to oil within the crankcase, it is obvious that the valve apparatus of the present invention may be used for draining any fluid medium from a fluid reservoir. Thus, the term "reservoir" is virtually synonymous with "crankcase" as used herein. For example, the valve apparatus of the present invention may be used to drain hydraulic fluid from a transmission, etc. Other types of fluids may also be drained from a reservoir, such as various types of industrial solvents or industrial fluids, corrosive fluids, water, etc. For certain kinds of fluids, such as corrosive fluids, the valve apparatus as well as the hose or tubing and the pump, will have to be made of materials appropriate to the type of fluid involved.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Drain valve apparatus for draining a fluid from a reservoir, comprising, in combination:
   valve body means, including
      a valve body securable to a reservoir to be drained,
      first bore means in the valve body communicating with the fluid to be drained, and
      second bore means in the valve body communicating with the first bore means, and
      a threaded portion for securing the valve body to a threaded drain opening of the reservoir to be drained; and
   insert means secured to the valve body means and extending into the second bore means and out of the valve body means, including
      a tube having a first end for receiving the fluid from the first bore means,
      a valve seat in the tube at the first end,
      a ball in the tube,
      spring means for biasing the ball against the seat, and
      connector means extending outwardly from the valve body means for connecting the tube to a conduit for receiving the fluid from the first bore means when the ball is moved off the valve seat.

2. The apparatus of claim 1 in which the first bore means comprises a first bore portion in the valve body, and the second bore means comprises a second bore portion communicating with the first bore portion for receiving the insert means, and the fluid flows into the sleeve means from the first bore portion.

3. The apparatus of claim 1 in which the first bore means comprises a first bore in the valve body and the second bore means comprises a second bore in the valve body intersecting the first bore.

4. The apparatus of claim 1 in which the insert means further includes the first end of the tube disposed within the valve body and a second end of the tube disposed out of the valve body.

5. The apparatus of claim 4 in which the first end of the a insert means includes an inwardly extending portion, and the valve seat is disposed at the inwardly extending portion.

6. The apparatus of claim 4 in which the connector means is disposed at the second end of the insert means.

* * * * *